(12) United States Patent
Miura

(10) Patent No.: US 7,787,650 B2
(45) Date of Patent: Aug. 31, 2010

(54) ELECTROMAGNETIC EXCITER

(75) Inventor: Naoki Miura, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 1174 days.

(21) Appl. No.: 11/404,429

(22) Filed: Apr. 14, 2006

(65) Prior Publication Data
US 2006/0244400 A1 Nov. 2, 2006

(30) Foreign Application Priority Data
Apr. 19, 2005 (JP) ............... 2005-121667

(51) Int. Cl.
H04R 25/00 (2006.01)
(52) U.S. Cl. ...................... 381/396; 412/404
(58) Field of Classification Search .......... 381/396, 381/191, 433, 404, 398; 310/89
See application file for complete search history.

(56) References Cited
U.S. PATENT DOCUMENTS
7,436,088 B2 10/2008 Miura
2005/0285454 A1* 12/2005 Choi et al. .............. 310/14

OTHER PUBLICATIONS
U.S. Appl. No. 11/441,740, filed May 25, 2006.
* cited by examiner Primary Examiner—Suhan Ni
Assistant Examiner—Jasmine Pritchard
(74) Attorney, Agent, or Firm—Brinks Hofer Gilson & Lione

(57) ABSTRACT

An electromagnetic exciter includes a magnetic circuit assembly having an outer yoke, a magnet, and an inner yoke. A voice coil is inserted into a magnetic gap formed in the magnetic circuit assembly. A casing having a cylindrical wall is disposed around the magnetic circuit assembly. A suspension is set between a cylindrical side wall of the outer yoke and the cylindrical wall of the casing to supportingly connect the magnetic circuit assembly to the cylindrical wall of the casing. A weight is secured to the outer side surface of the side wall of the outer yoke. The suspension has an outer ring, an inner ring, and a pair of arcuate arms. Each arm is connected to the outer ring at one end thereof and connected to the inner ring at the other end thereof. The arms and/or portions of the weight that face the arms are sloped so that the weight will not contact the arms when the magnetic circuit assembly is vibrated.

7 Claims, 4 Drawing Sheets

ELECTROMAGNETIC EXCITER

This application claims priority under 35 U.S.C. §119 to Japanese Patent Application No. JP2005-121667 filed Apr. 19, 2005, the entire content of which is hereby incorporated by reference.

BACKGROUND OF THE INVENTION

1. Field of the Invention

The present invention relates to electromagnetic exciters that may be incorporated into mobile communications devices such as cellular phones and personal digital assistants (PDAs) to inform a user of an incoming call by vibrating, for example, the housing of such a mobile communication device.

2. Description of the Related Arts

Conventionally, mobile communication devices, e.g. cellular phones and PDAs, are arranged to inform the user of an incoming call by selectively generating beep sound or melody sound, or vibrating the housing of the device instead of producing sound. For this purpose, the conventional practice is to employ a structure incorporating a combination of a sound-generating speaker categorized as a microspeaker and a vibrator that generates vibration by rotating an eccentric weight with a small motor. Incorporating both the speaker and the vibrator as stated above, however, is disadvantageous from the viewpoint of achieving size and cost reduction of the device. Under these circumstances, use has recently been made of an electromagnetic exciter that can generate both sound and vibration by itself.

The inventor of this application developed an electromagnetic exciter 51 as shown in FIGS. 6 to 8 (Japanese Patent Application No. 2005-014919).

FIG. 6 is a vertical sectional view showing the right-hand half of the electromagnetic exciter 51. The left-hand half of the electromagnetic exciter 51 is substantially symmetric to the right-hand half with respect to the center axis C of the electromagnetic exciter 51. The electromagnetic exciter 51 has a magnetic circuit assembly 62 including a pan-shaped outer yoke 8, a circular columnar permanent magnet 9, and an inner yoke 10. The permanent magnet 9 and the inner yoke 10 are successively stacked in the outer yoke 8. The magnetic circuit assembly 62 is suspended within a cylindrical casing 52 by a suspension 63. A top plate 52a is provided to cover the upper end opening of the casing 52. A voice coil 5 is secured to the top plate 52a. A ring-shaped weight 61 is secured to the outer peripheral portion of the outer yoke 8. A back member 4 made of a dust-proof mesh or metal plate, for example, is provided to cover the lower end opening of the casing 52. The weight 61 is used to reduce the natural frequency of the magnetic circuit assembly 62 and generally formed by using a high-density material, e.g. tungsten. A magnetic gap g is formed between the inner yoke 10 and the upper end of the outer yoke 8. The voice coil 5 is positioned in the magnetic gap g.

FIG. 7 is a plan view of the suspension 63. The suspension 63 is formed by stamping a leaf spring member. The suspension 63 has an inner ring 63a and an outer ring 63b, which are in concentric relation to each other, and a pair of arcuate arms 63c that interconnect the inner and outer rings 63a and 63b. As shown in FIG. 6, the inner ring 63a of the suspension 63 is secured to the outer yoke 8 of the magnetic circuit assembly 62. The outer ring 63b is secured to the casing 52 by being clamped between an outer cylindrical portion 52b and an inner cylindrical portion 52c of the casing 52. The spacing between the outer ring 63b and each arm 63c is set larger than the spacing between the arm 63c and the inner ring 63a. Arcuate projections provided on the outer peripheral edge of the weight 61 are inserted between the outer ring 63b and the arms 63c. The purpose of this arrangement is to increase the mass of the weight 61 by effectively utilizing the space in the electromagnetic exciter 51.

The electromagnetic exciter 51 is secured to an electronic device such as a cellular phone by applying a double-sided adhesive tape to the top plate 52a and attaching the adhesive tape to the housing of the cellular phone, for example. When the voice coil 5 is excited by an input driving signal, the voice coil 5 and the magnetic circuit assembly 62 vibrate relative to each other by interaction between the coil 5 and the magnet 9. When the driving signal is of a relatively high frequency in an audio-frequency region, the voice coil 5 mainly vibrates, causing the housing of the electronic device to vibrate through the top plate 52a. When the frequency of the driving signal is low, the magnetic circuit assembly 62 mainly vibrates, and this vibration causes the housing of the electronic device to vibrate through the suspension 63 and the casing 52.

In the electromagnetic exciter 51 shown in FIG. 6, the magnetic circuit assembly 62 is supportingly connected to the casing 52 by the suspension 63 arranged as stated above. Therefore, when the magnetic circuit assembly 62 is vibrated, the magnetic circuit assembly is moved up and down, together with the inner ring 63a, relative to the outer ring 63b, which is secured to the casing 52. Accordingly, the arcuate arms 63c of the suspension 63 arcuately bend about the respective outer joints 63d, so that the arms 63c are displaced greatly near the inner joints 63e and displaced a little near the outer joints 63d. Since the weight 61 is moved up and down together with the inner ring 63a, the weight is likely to be brought into contact with the arms 63c near the outer joints 63d.

Under the circumstances, it is conventional that a clearance h1 is provided between the magnetic circuit assembly 62 and the top plate 52a so that the magnetic circuit assembly 62 will not contact the top plate 52a even when the magnetic circuit assembly 62 vibrates with a maximum amplitude relative to the top plate 52a. Further, the clearance between the weight 61 and the arms 63c of the suspension 63 is set to a uniform size h2 that is sufficiently large to avoid contact between the weight 61 and the arms 63c near the outer joints 63d.

Meanwhile, in order to increase the acceleration of vibration occurring in the electromagnetic exciter 51, the weight 61 needs to be made as large as possible.

SUMMARY OF THE INVENTION

The present invention was made in view of the above-described circumstances. Accordingly, an object of the present invention is to make it possible to maximize the size of the weight by effectively utilizing the space in the electromagnetic exciter.

The present invention provides an electromagnetic exciter including a magnetic circuit assembly that includes an outer yoke having a cylindrical side wall and a bottom wall formed at one end of the side wall. The magnetic circuit assembly further includes a magnet and an inner yoke that are successively stacked on the bottom wall in the outer yoke. A magnetic gap is formed between the inner yoke and the side wall. A voice coil is inserted into the magnetic gap. The electromagnetic exciter further includes a casing that accommodates the magnetic circuit assembly and the voice coil. The casing has a cylindrical wall disposed around the cylindrical side wall of the magnetic circuit assembly. A suspension is set between the other end of the cylindrical side wall of the outer yoke and the cylindrical wall of the casing to supportingly connect the magnetic circuit assembly to the cylindrical wall of the casing. A weight is secured to the outer side surface of the side wall of the outer yoke. The suspension has a radially inner section secured to the other end of the side wall of the outer yoke, a radially outer section secured to the cylindrical wall of the casing, and a connecting section that interconnects the radially inner section and the radially outer section. The radially outer section is secured to the cylindrical wall of the casing at a position more distant from the weight than the radially inner section in a direction of an axis of the cylindrical wall, so that the connecting section is sloped between the radially inner section and the radially outer section.

In this electromagnetic exciter, the positional relationship between the radially outer and inner sections of the suspension makes it possible that the weight is set closer to the suspension so that the size and mass of the weight can be increased, while avoiding contact of the weight with the part of the connecting section that is close to the radially outer section.

Specifically, the suspension may be arranged as follows. The radially outer section and the radially inner section of the suspension are an outer ring and an inner ring, respectively, which are concentric to an axis of the cylindrical side wall of the outer yoke, and the connecting section is a pair of arcuate arms symmetrically disposed about the axis of the cylindrical side wall of the outer yoke in an annular space between the outer ring and the inner ring. Each arm is connected to the outer ring at one end thereof and connected to the inner ring at the other end thereof.

In addition, the present invention provides an electromagnetic exciter including a magnetic circuit assembly that includes an outer yoke having a cylindrical side wall and a bottom wall formed at one end of the side wall. The magnetic circuit assembly further includes a magnet and an inner yoke that are successively stacked on the bottom wall in the outer yoke. A magnetic gap is formed between the inner yoke and the side wall. A voice coil is inserted into the magnetic gap. The electromagnetic exciter further includes a casing that accommodates the magnetic circuit assembly and the voice coil. The casing has a cylindrical wall disposed around the cylindrical side wall of the outer yoke. A suspension is set between the other end of the cylindrical side wall of the outer yoke and the cylindrical wall of the casing to supportingly connect the magnetic circuit assembly to the cylindrical wall of the casing. A weight is secured to the outer side surface of the side wall of the outer yoke. The suspension comprises a radially inner section secured to the other end of the cylindrical side wall of the outer yoke, a radially outer section secured to the cylindrical wall of the casing, and connecting sections between the radially inner and the outer sections. Each connecting sections is connected to the radially outer section at one end thereof and to the radially inner section at the other end thereof. The weight has a surface facing the suspension. The surface has regions axially opposed to the connecting sections, respectively, and is sloped so that the axial clearance between each of the connecting sections and corresponding one of the regions increases as the distance from the other end of the connecting sections increases toward the one end thereof.

In this electromagnetic exciter, the axial clearance between each arm and the region opposed to the arm arranged as stated above makes it possible to set the weight closer to the suspension so that the size and mass of the weight can be increased, while avoiding contact of the weight with the part of the connecting section that is close to the radially outer section.

The suspension may extend perpendicularly to the axis of the cylindrical side wall of the outer yoke.

Further, the suspension may comprise a radially inner section secured to the other end of the side wall of the outer yoke, a radially outer section secured to the cylindrical wall of the casing, and a connecting section interconnecting the radially inner section and the radially outer section. The radially outer section may be secured to the cylindrical wall of the casing at a position more distant from the weight than the radially inner section in a direction of the axis, so that the connecting section is sloped between the radially inner section and the radially outer section.

Furthermore, the radially outer section and radially inner section of the suspension may be an outer ring and an inner ring, respectively, which are concentric to the axis of the cylindrical side wall of the outer yoke. The connecting section may comprises a pair of arcuate arms symmetrically disposed about the axis in an annular space between the outer ring and the inner ring, each of the arms being connected to the outer ring at one end thereof and connected to the inner ring at the other end thereof.

According to the present invention, the size of the weight can be increased by effectively utilizing the limited space in the electromagnetic exciter, and hence the mass of the magnetic circuit assembly with the weight can be increased. Therefore, it is possible to increase the acceleration of vibration in the electromagnetic exciter.

The above and other objects, features and advantages of the present invention will become more apparent from the following description of the preferred embodiments thereof, taken in conjunction with the accompanying drawings.

DESCRIPTION OF THE PREFERRED EMBODIMENTS

Figure 1:
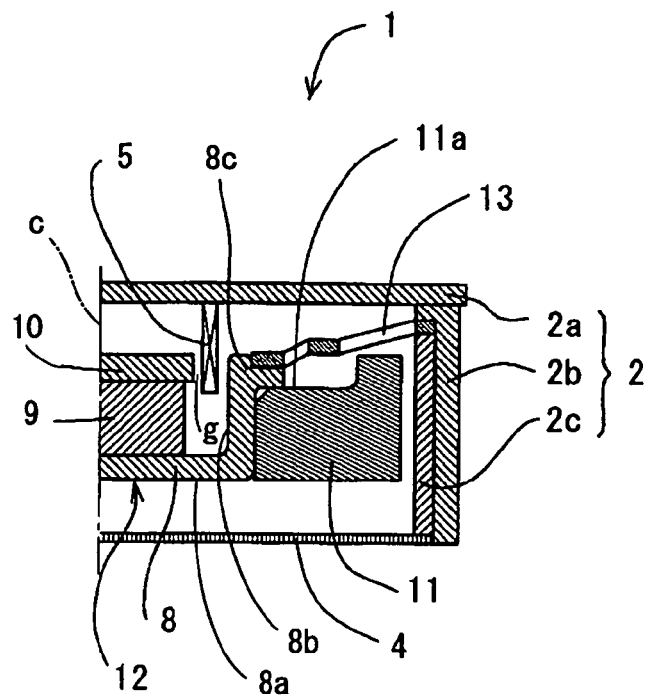
FIG. 1 is a fragmentary sectional view of the right-hand half of an electromagnetic exciter according to a first embodiment of the present invention.
Figure 2:
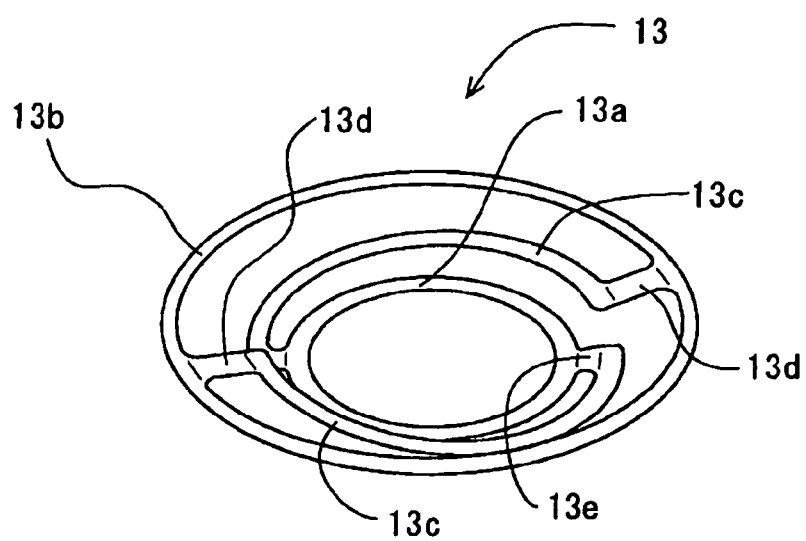
FIG. 2 is a perspective view of a suspension of the electromagnetic exciter according to the first embodiment of the present invention.
Figure 3:
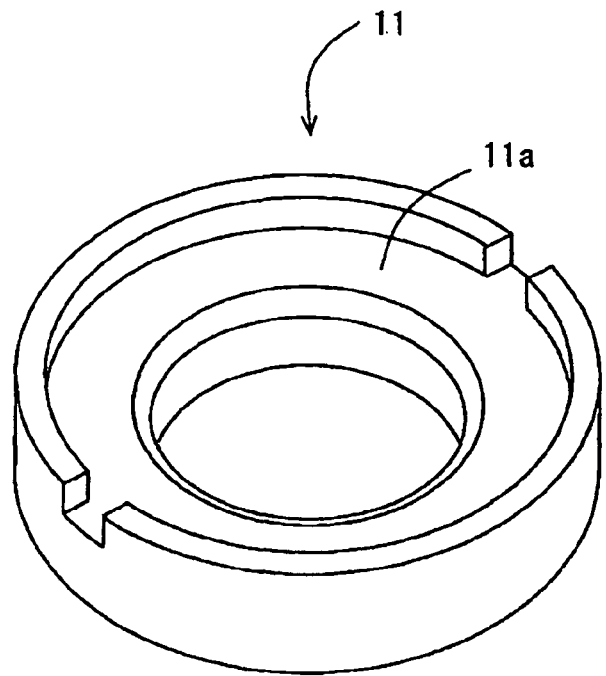
FIG. 3 is a perspective view of a weight of the electromagnetic exciter according to the first embodiment of the present invention.

Embodiments of the present invention will be described below in detail with reference to the accompanying drawings. FIG. 1 is a fragmentary sectional view of the right-hand half of an electromagnetic exciter 1 according to a first embodiment of the present invention. The left-hand half of the electromagnetic exciter 1 is substantially symmetric to the right-hand half with respect to the center axis C of the electromagnetic exciter 1. FIG. 2 is a perspective view of a suspension 13 of the electromagnetic exciter 1. FIG. 3 is a perspective view of a weight 11 of the electromagnetic exciter 1.

Figure 6:
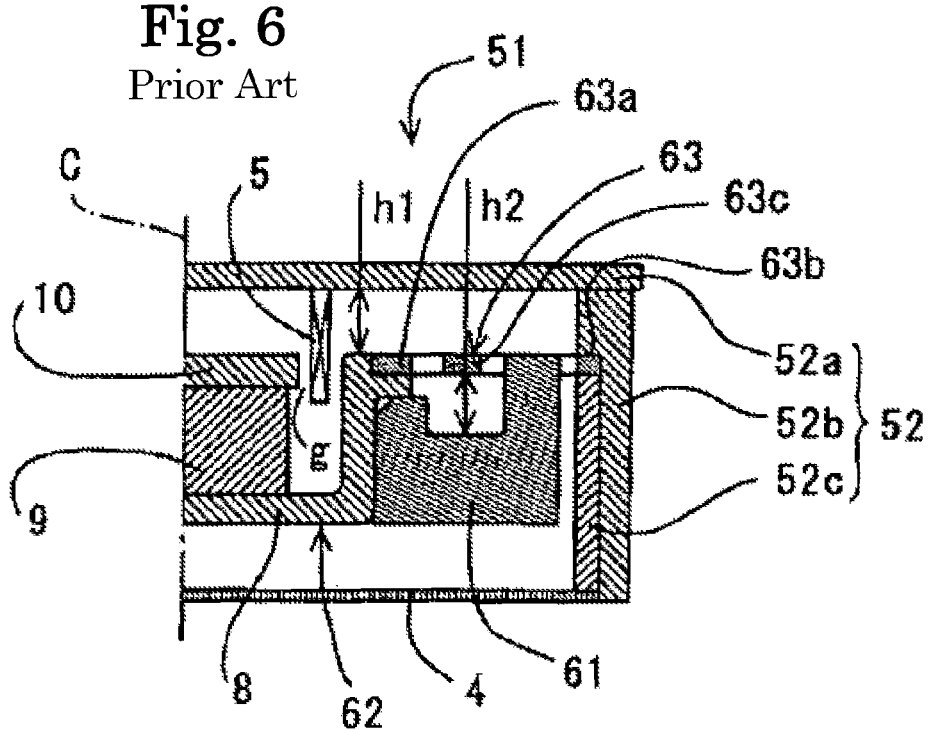
FIG. 6 is a fragmentary sectional view of the right-hand half of a conventional electromagnetic exciter.

The electromagnetic exciter 1 has a substantially similar arrangement to that of the above-described electromagnetic exciter 51 shown in FIG. 6. That is, the electromagnetic exciter 1 has a cylindrical casing 2, a magnetic circuit assembly 12 and a voice coil 5, which are provided in the casing 2.

The magnetic circuit assembly 12 includes an outer yoke 8 having a cylindrical side wall 8b and a bottom wall 8a. The magnetic circuit assembly 12 further includes a magnet 9 and an inner yoke 10 that are successively stacked on the bottom wall 8a in the outer yoke 8. A magnetic gap g is formed between the outer yoke 8 and the inner yoke 10. The voice coil 5 is an air-core voice coil having a coil winding formed by annularly winding an enamel-coated copper wire. The voice coil 5 is secured to a top plate 2a of the casing 2 and inserted into the magnetic gap g. The magnetic circuit part 12 is resiliently suspended to the casing 2 by a suspension 13 so as to be vibratable in the axial direction. A ring-shaped weight 11 is secured by being fitted to the outer surface of the cylindrical side wall 8b of the outer yoke 8. The lower end opening of the casing 2 is covered with a back member 4 made of a dust-proof mesh or metal plate, for example.

Figure 7:
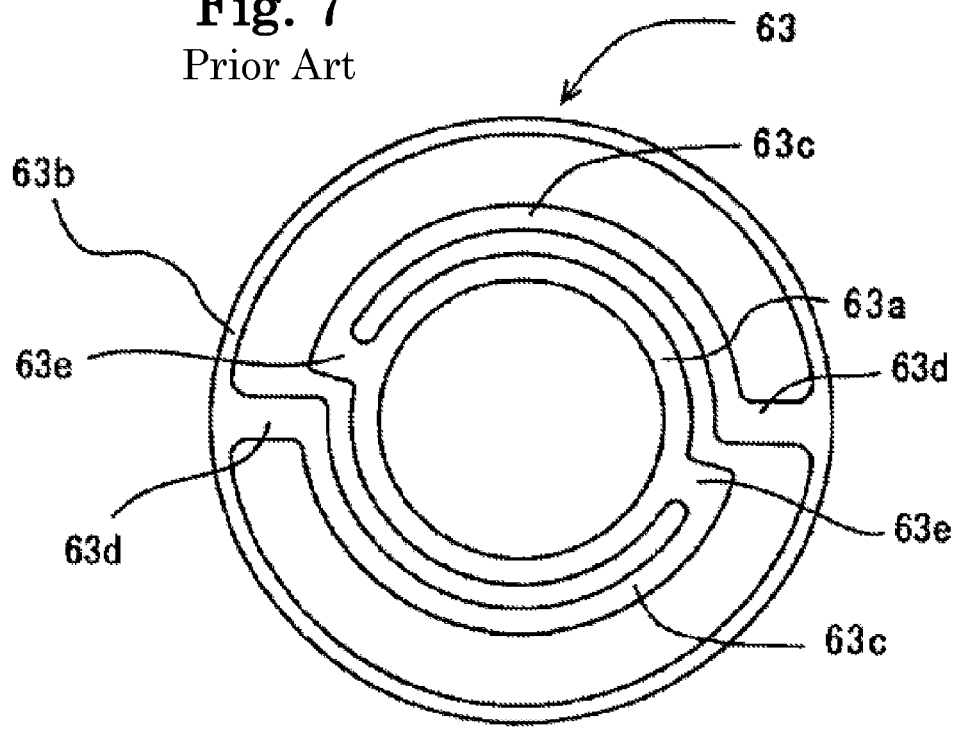
FIG. 7 is a plan view of a suspension of the conventional electromagnetic exciter.

As shown in FIG. 2, the suspension 13 has a similar arrangement to that of the suspension 63 shown in FIG. 7. That is, the suspension 13 has an inner ring 13a and an outer ring 13b, which are in concentric relation to each other, and a pair of arcuate arms 13c that interconnect the inner and outer rings 13a and 13b. The suspension 13 is formed, for example, by stamping a flat leaf spring member.

The electromagnetic exciter 1 according to the first embodiment is characterized in that, as will be understood from FIGS. 1 and 2, the inner ring 13a of the suspension 13 is displaced relative to the outer ring 13b in the axial direction of the electromagnetic exciter 1 (i.e. displaced downward as viewed in FIG. 1). More specifically, the outer ring 13b is positioned closer to the top plate 2a of the casing 2 than in the electromagnetic exciter 51 shown in FIG. 6, while, as in the electromagnetic exciter 51, the outer ring 13b is secured to the casing 2 by being clamped between an outer cylindrical portion 2b and an inner cylindrical portion 2c of the casing 2 and the inner ring 13a is secured to the upper end surface of the cylindrical side wall 8b of the outer yoke 8.

As stated with regard to the electromagnetic exciter 51 shown in FIG. 6, when the voice coil 5 is excited by an input driving signal, the magnetic circuit assembly 12 vibrates relative to the voice coil 5. Therefore, the inner ring 13a needs to be set at a position where it will not contact the top plate 2a even when the magnetic circuit assembly 12 is vibrated with a maximum amplitude, whereas the outer ring 13b can be positioned close to the top plate 2a because it does not move relative to the casing 2 and hence the top plate 2a.

Because of the above-described positional relationship between the outer ring 13b and the inner ring 13a, the arcuate arms 13c, which extend between the outer ring 13b and the inner ring 13a, are gradually sloped between the outer joints 13d and the inner joints 13e.

By virtue of the above-described configuration of the suspension 13, even if the surface 11a of the weight 11 is positioned closer to the arms 13c of the suspension 13 than in the case of FIG. 6, the weight 11 is unlikely to contact the arms 13c, and it becomes possible to increase the weight 11 in size correspondingly.

Figure 4:
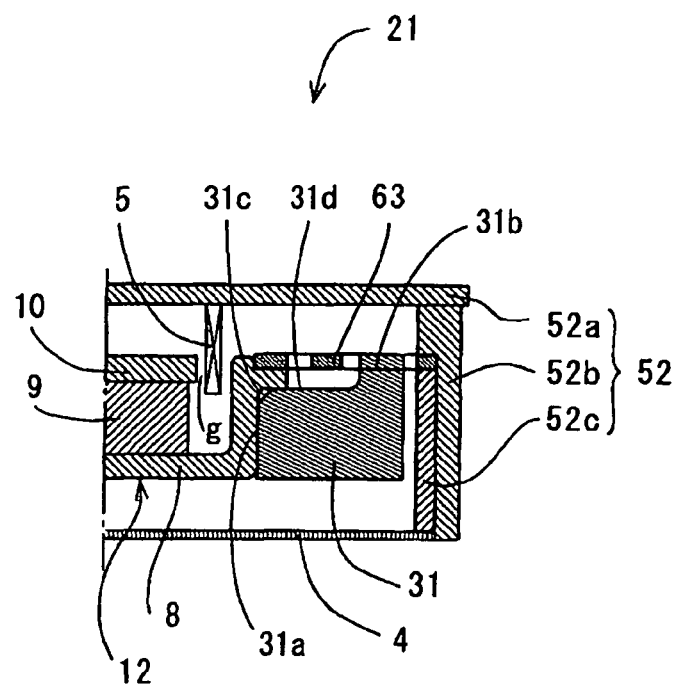
FIG. 4 is a fragmentary sectional view of the right-hand half of an electromagnetic exciter according to a second embodiment of the present invention.
Figure 5:
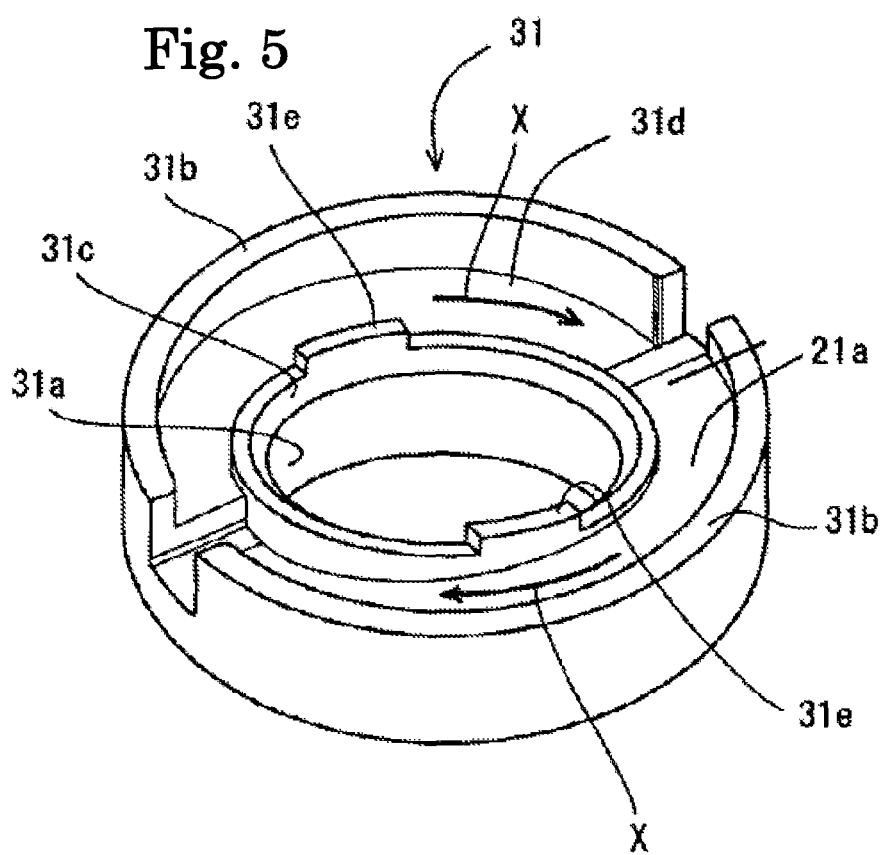
FIG. 5 is a perspective view of a weight of the electromagnetic exciter according to the second embodiment of the present invention.

FIG. 4 is a fragmentary sectional view showing the right-hand half of an electromagnetic exciter 21 according to a second embodiment of the present invention. FIG. 5 is a perspective view showing a weight 31 of the electromagnetic exciter 21. The electromagnetic exciter 21 has a substantially similar arrangement to that of the electromagnetic exciter 51 shown in FIG. 6. In FIG. 4, the same constituent elements as those of the electromagnetic exciter 51 are denoted by the same reference numerals, and a detailed description thereof is omitted. The electromagnetic exciter 21 is characterized by the configuration of the weight 31 shown in FIG. 5.

Figure 8:
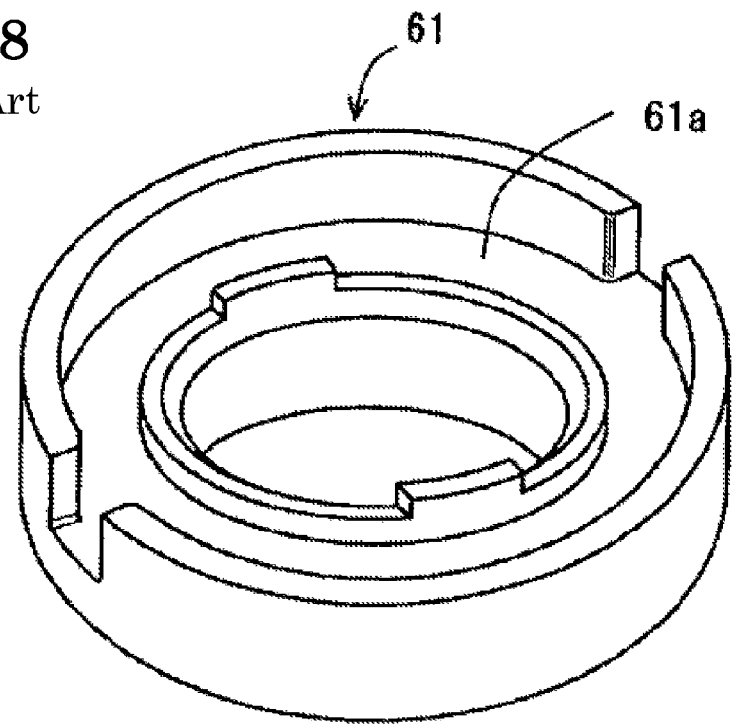
FIG. 8 is a perspective view of a weight of the conventional electromagnetic exciter.

The weight 31 is in the shape of a ring having an inner peripheral surface 31a to be fitted to the outer peripheral surface of the outer yoke 8. The weight 31 is generally similar to the weight 61 shown in FIG. 8 with regard to the following points: on the outer peripheral edge of the upper end surface of the weight 31 there are provided arcuate projections 31b which are adapted to be inserted into the spaces between the outer ring 63b and the arcuate arms 63c of the suspension 63; and, on the inner peripheral edge of the upper end surface of the weight 31 there are provided projections 31e which are adapted to be engaged with respective recesses (not shown) formed in a flange portion 8c of the cylindrical side wall 8b of the outer yoke 8. A chamfered portion 31c is provided at the upper end edge of the inner peripheral surface 31a. The characteristic feature of the weight 31 resides in that the upper end surface 31d thereof is divided into two parts which are respectively sloped down in the circumferential direction shown by the arrow X so that the clearance between the upper end surface 31d and the arcuate arms 63c of the suspension 63 is substantially uniform throughout the upper end surface 31d when the magnetic circuit assembly 12 vibrates with a maximum amplitude (i.e. when the magnetic circuit assembly 12 is displaced most upwardly as viewed in FIG. 4. In the first embodiment, the arms of the suspension are sloped relative to the flat surface of the weight that faces the suspension to avoid contact between the weight and the arms. Conversely, in the second embodiment, the suspension is flat as a whole, and the surface of the weight that faces the suspension is provided with the slopes to avoid contact between the weight and the suspension.

It should be noted that an electromagnetic exciter in accordance with the present invention may adopt the characteristic features of both the first and second embodiments, whereby the degree of the slopes of the arms of the suspension and the degree of the slopes formed in the upper surface of the weight can be reduced in comparison with those in the first and second embodiments.

The electromagnetic exciter according to the present invention can be widely applied to mobile communication devices, such as cellular phones and PDAs, and other devices, e.g. gaming devices.

It should be noted that the present invention is not necessarily limited to the foregoing embodiments but can be modified in a variety of ways without departing from the gist of the present invention.

What is claimed is:

1. An electromagnetic exciter comprising:
   a magnetic circuit assembly comprising an outer yoke including a bottom wall and a cylindrical side wall extending from a peripheral portion of the bottom wall upward with an axis centered, the cylindrical side wall of the outer yoke having an upper end that is opposite to the peripheral portion of the bottom wall,
   the magnetic circuit assembly further comprising a magnet and an inner yoke that are successively stacked on the bottom wall of the outer yoke coaxially with the axis of the outer yoke, wherein a magnetic gap is formed between the inner yoke and the cylindrical side wall of the outer yoke;

a voice coil inserted into the magnetic gap;

a casing accommodating the magnetic circuit assembly and the voice coil that is inserted in the magnetic gap, the casing comprising a cylindrical wall disposed around the cylindrical side wall of the outer yoke;

a suspension secured on the upper end of the cylindrical side wall of the outer yoke and on the cylindrical wall of the casing to supportingly connect the magnetic circuit assembly to the casing; and a weight secured to an outer side surface of the cylindrical side wall of the outer yoke;

wherein the suspension comprises a radially inner section, a radially outer section, and a connecting section interconnecting the radially inner section and the radially outer section:

the radially inner section secured to the upper end of the cylindrical side wall of the outer yoke;

the radially outer section secured to the cylindrical wall of the casing; and wherein the radially outer section of the suspension is secured to the cylindrical wall of the casing at a higher position than the radially inner section that is secured on the upper end of the cylindrical side wall of the outer yoke with the connecting section slopingly connecting the radially inner section and the radially outer section.

2. The electromagnetic exciter according to claim 1, wherein the radially outer section of the suspension comprises an outer ring and the radially inner section of the suspension comprises an inner ring, and the outer ring and the inner ring are arranged coaxially with the axis, and the connecting section comprises a pair of arcuate arms symmetrically disposed about the axis in an annular space between the outer ring and the inner ring, each of the arms being connected to the outer ring at one end of the each arm and connected to the inner ring at an other end of the each arm.

3. An electromagnetic exciter comprising:

a magnetic circuit assembly comprising an outer yoke including a bottom wall and a cylindrical side wall extending from a peripheral portion of the bottom wall upward with an axis centered, the cylindrical side wall of the outer yoke having an upper end that is opposite to the peripheral portion of the bottom wall, the magnetic circuit assembly further comprising a magnet and an inner yoke that are successively stacked on the bottom wall of the outer yoke coaxially with the axis of the outer yoke, wherein a magnetic gap is formed between the inner yoke and the cylindrical side wall of the outer yoke;

a voice coil inserted into the magnetic gap;

a casing accommodating the magnetic circuit assembly and the voice coil that is inserted in the magnetic gap, the casing comprising a cylindrical wall disposed around the cylindrical side wall of the outer yoke;

a suspension secured on the upper end of the cylindrical side wall of the outer yoke and on the cylindrical wall of the casing to supportingly connect the magnetic circuit assembly to the casing; and a weight secured to an outer side surface of the cylindrical side wall of the outer yoke;

wherein the suspension comprises a radially inner section, a radially outer section, and a connecting section interconnecting the radially inner section and the radially outer section:

the radially inner section secured to the upper end of the cylindrical side wall of the outer yoke;

the radially outer section secured to the cylindrical wall of the casing; and the weight having a surface facing the suspension, the surface of the weight having regions opposed to the connecting section of the suspension, and the regions of the weight being sloped.

4. The electromagnetic exciter according to claim 3, wherein the suspension has a flat shape as a whole.

5. The electromagnetic exciter according to claim 3, wherein the radially outer section of the suspension is secured to the cylindrical wall of the casing at a higher position than the radially inner section that is secured on the upper end of the outer yoke with the connecting section slopingly connecting the radially inner section and the radially outer section.

6. The electromagnetic exciter according to claims 3, wherein the radially outer section of the suspension comprises an outer ring and the radially inner section of the suspension comprises an inner ring, and the outer ring and the inner ring are arranged coaxially with the axis, and the connecting section comprises a pair of arcuate arms symmetrically disposed about the axis in an annular space between the outer ring and the inner ring, each of the arms being connected to the outer ring at one end of the each arm and connected to the inner ring at an other end of the each arm.

7. The electromagnetic exciter according to claim 5, wherein the radially outer section of the suspension comprises an outer ring, and radially inner section of the suspension comprises an inner ring, and the outer ring and the inner ring are coaxially with the axis, and the connecting sections comprises a pair of arcuate arms symmetrically disposed about the axis in an annular space between the outer ring and the inner ring, each of the arms being connected to the outer ring at one end of the each arm and connected to the inner ring at an other end of the each arm.

* * * * *

UNITED STATES PATENT AND TRADEMARK OFFICE
CERTIFICATE OF CORRECTION

PATENT NO. : 7,787,650 B2  Page 1 of 1
APPLICATION NO. : 11/404429
DATED : August 31, 2010
INVENTOR(S) : Naoki Miura It is certified that error appears in the above-identified patent and that said Letters Patent is hereby corrected as shown below:

On the Title Page

Item (75), replace "Fujiyoshida" with --Fujiyoshida-shi--.

In the Claims

In column 8, claim 6, line 31, after "exciter according to" replace "claims 3" with --claim 3--.

In column 8, claim 7, line 45, after "and the connecting" replace "sections" with --section--.

Signed and Sealed this

Thirtieth Day of November, 2010

David J. Kappos
*Director of the United States Patent and Trademark Office*